United States Patent Office 3,616,506
Patented Nov. 2, 1971

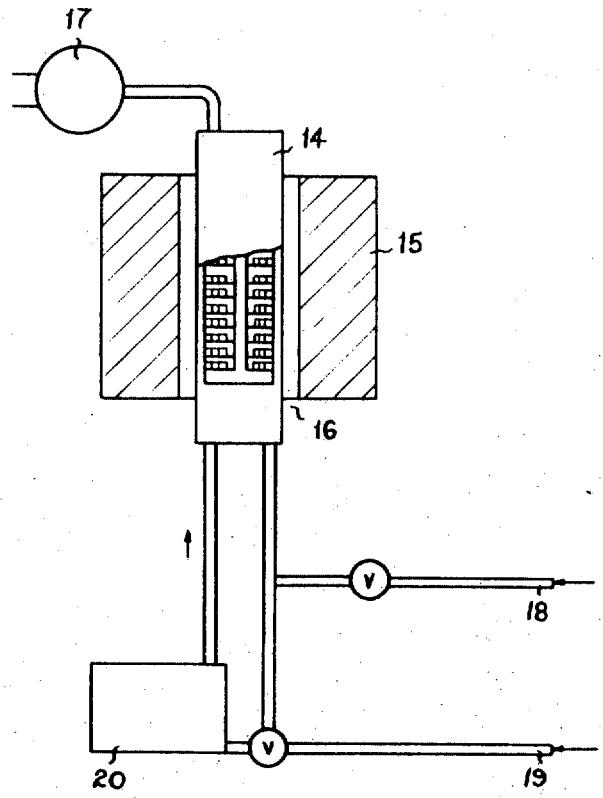

3,616,506
INSERT FOR MACHINING STEEL OR
SIMILAR MATERIAL
Carl Sven Gustaf Ekemar, Lannersta, Sweden, assignor to Sandvikens Jernverks Aktiebolag, Sandviken, Sweden
Filed Jan. 13, 1970, Ser. No. 2,540
Claims priority, application Sweden, Jan. 2, 1969, 32/69; Feb. 21, 1969, 2,400/69
Int. Cl. B26d 1/00; B21k 21/00
U.S. Cl. 29—95
21 Claims

ABSTRACT OF THE DISCLOSURE

In the field of covering a face of a cemented carbide cutting body with a layer of wear-resistant material, the improvement consists in depositing said material from a gaseous phase containing a gaseous compound of a carbide-forming metal, hydrogen and methane or similar gaseous hydrocarbon, said deposition being effected at an elevated temperature and at sub-atmospheric pressure.

This invention relates to inserts for chip-forming machining of steel, other metals, artificial materials, etc. The inserts can be fastened to the cutting tool by clamping, soldering or by other means, and can for instance have the shape of a plate having cutting edges between one or both end faces of the plate and its side surfaces. The end face or end faces constitute chip-forming faces while the side edges are clearance faces.

SUMMARY

According to the invention, the insert consists of a cutting body of a sintered hard metal alloy of the type which besides one or more carbides such as tungsten carbide, titanium carbide, tantalum carbide and/or niobium carbide contains binder metal like cobalt, nickel and/or iron, on which cutting body a layer with higher wear resistance than that of the hard metal is applied by deposition from a gaseous phase consisting essentially of a gaseous compound of a carbide forming metal, hydrogen and a gaseous hydrocarbon.

It previously had been known how to apply a layer of a material of higher wear resistance on a surface of a cemented carbide cutting body. These earlier known layers have in general been constituted by a cemented carbide having a different composition, for instance, with a higher TiC-content than in the underlying part (the substratum). The preparation of the product disposed in layers has been done by sintering. The applied layer has, like the underlying part (the substratum), contained binder metal. It is also known to apply hard, wear-resistant layers on metallic substrata in other ways. Because of technical reasons, as well as in order to reach a desired wear-resistance, these layers have been made relatively thick. Inserts of these earlier types have proved to be afflicted with serious disadvantages and have, therefore, not come to general use. Thus, the applied layers have completely or partially loosened from the substratum, or cracked at an early stage of use, or even before use of the insert. The layers which have consisted of a more wear-resistant cemented carbide cannot, of course, in and of themselves give any exceptional increase of the life of the inserts, even if fracture does not happen.

Surprisingly, it has now been found that it is possible to make inserts for chip-forming machining of steel and similar materials which, in comparison with conventional inserts, show a decrease in cratering of up to about 10 times. These inserts are supplied with a surface layer which does not loosen or fracture during use of the inserts.

According to the invention, the applied wear-resistant layer consists of an extremely fine-grained titanium carbide—or an equally extremely fine-grained solid solution of titanium carbide and one or more other carbides like tungsten carbide, tantalum- and/or niobium carbide—which layer has been attached to a surface of the cutting body or the substratum by deposition from a gaseous phase at a pressure lower than atmospheric pressure. The titanium carbide (or the solid solution of titanium carbides and other carbides) deposit has, then, a grain size of about between one and a few (for instance, one and six) tenths of a $\mu$m. (micron).

When applying the titanium carbide layer it is suitable to start from titanium tetrachloride and hydrogen mixed with a gaseous hydrocarbon such as methane. Application suitably is done at a temperature between 700–1100° C., for instance between 750–1050° C. The applying is however done at a temperature preferably between 750–900° C., but sometimes a temperature of about 1000° C. has proved to be suitable. The gas pressure should be kept between 1–100 torr, and the gas ought to flow through the vessel in which the deposition is being conducted.

To obtain the exceptional quality-improvement which is characteristic of the invention, it has proved necessary that the applied layer should be extremely thin, between 2–6 $\mu$m. Its thickness should generally be below 5 $\mu$m. and preferably exceed 3 $\mu$m. If the above-mentioned narrow limits are not observed, the most favorable qualities will not be obtained. Thus, if the layer is too thin, the desired wear resistance will not be achieved. If the maximum limit is exceeded, the layer tends to loosen rapidly and fracture by stresses which arise between layer and substratum during use. According to an embodiment of the inserts in accordance with the invention the applied wear-resistant layer should comprise at least the cutting edge or edges and the connecting chip face or faces and generally also the connecting phase surface or surfaces. According to another embodiment the layer covers the chip face or faces and preferably the clearance face or faces, but leaves the cutting edge or edges free. However, it frequently is desirable to coat the entire cutting body or substratum with a layer of the above-described kind.

The cutting body or substratum shall consist of a sintered hard metal alloy containing one or more carbides such, for example, as tungsten carbide, titanium carbide, tantalum carbide and/or niobium carbide and also binding metal such as cobalt, nickel and/or iron. It (the cutting body) should be manufactured to desired shape before the wear-resistant layer is applied. The carbide grains in the hard metal alloy should further have a mean grain size between 0.5–3 $\mu$m.

As an example of a sintered hard metal alloy suitable for the cutting body or substratum the following can be mentioned, the analyses being given in percentages by weight: 4–25% TiC, 0–20% TaC and/or NbC, 7–11% Co and/or Ni and the balance save for incidental impurities. Furthermore, it is often advantageous that the alloy contains chromium carbide, for instance in an amount between 0.5 and 10% by weight. To the said body or substratum there is attached a layer of extremely fine-grained titanium carbide, as above described, having a thickness between 3–5 $\mu$m. (microns), preferably about 4 $\mu$m. (microns).

It has been found, also, that an additional essential improvement in the properties of the coated hard metal body can be obtained if the carbide layer is built up so that it contains a particularly fine-grained layer next to the substratum (i.e., the "inner layer") and a somewhat more coarse-grained growth zone at the surface. The mean grain size of the inner layer should be of the magnitude of 0.02–0.15 μm. and that of the growth zone of about 0.2–0.4 μm. As an example can here be mentioned, that the mean grain size of the inner layer was about 0.1 μm., and that of the growth zone about 0.3 μm. The heterogeneous structure in the layer had been attained by an adjustment from lower to higher temperature values during the process of deposition.

It previously had been known that several of the hard carbides, which are normally included in sintered hard metal, have so-called extended area of homogeneity. This implies that the carbon content of the carbide is variable and can be below the stoichiometric content to a certain extent. Among such carbides have been mentioned TiC, TaC and VC, which, however, in normal use in sintered hard metal have carbon contents which do not to a great extent deviate from the stoichiometric content.

It surprisingly has now been found that an essential improvement in the properties, and an increased uniformity in the quality of the coated insert, can be attained if the hard wear-resistant surface layer has such a composition that the carbon content of the fine-grained titanium carbide and/or the solid solution in which titanium carbide is included, is essentially below the stoichiometric composition of respective carbide which composition in the case of titanium carbide corresponds to 80% by weight of Ti and 20% by weight of C. The carbon content of the surface layer according to the invention shall thus be at most $9/10$ of the stoichiometric carbon content of the carbide, which for instance in case of TiC means that the carbon content thus must not exceed 18% by weight. The carbon content of the carbide should on the other hand be at the least half the stoichiometric content, which for instance in case of TiC means a carbon content of at least 10% by weight. It has been found especially advantageous to locate the carbon content of TiC in the range of 10–15% by weight.

The deposition of the wear-resistant carbide layer may, as earlier has been mentioned, be effected by precipitation from a gaseous phase, with the modification, that the conditions on the reaction of the deposition shall imply a deficit of carbon. This criterion can be realized in different ways. According to one alternative, the cutting body or substratum may pass through a previous decarburizing, which may be done for instance by packing in decarburizing medium, such, for instance, as certain types of $Al_2O_3$, $TiO_2$ or other oxides, when sintering. In certain cases it has furthermore been found advantageous to include an active part, at least 0.5% and preferably at most 3 to 5% by weight, of O and/or N in the hypostoichiometric carbide, for instance titanium carbide. Oxygen and/or nitrogen in this case ought to be included in the form of very finely dispersed compounds, such for instance as Ti-oxides and/or -nitrides, having a grain size of from 0.01 to 0.05 μm.

A further essential improvement of the bond applied wear-resistant layer and a substratum, and an increased resistance of the insert to i.a. thermal shocks and mechanical impact stresses, has been obtained when the cutting body next to the surface layer has a zone with strikingly lower carbon content than in the rest of the body. This decarburized zone or intermediate layer may for instance be produced by the above-mentioned process of decarburizing, but it has been found particularly advantageous to regulate the process of carbide precipitation so that the hard metal substratum itself substantially emits the requisite amount of carbon in forming the carbide surface layer and thereby becomes decarburized. The hard metal substrate in this case must (in addition to binder metal such as Co, Ni and/or Fe) contain such hard metal alloys which have been found adjustably active to constitute carbon-emitters, as for instance carbides of W, Mo and/or Cr, where WC is preferably included. In this way the composition of the mentioned intermediate layer will correspond to certain phases with low carbon content in the three component-system W—Co—C, principally the so-called "η-phase," generally written $Co_3W_3C$, a well-known structure constituent per se in the cemented carbide field. It has often been found advantageous to substitute Co all or partly with Fe, Ni and/or Cr in the mentioned phases.

The decarburized zone of the intermediate layer ought to be uniformly developed, and to have a thickness in the range of 1–12 μm., preferably greater than 3 μm. and suitably smaller than 10 μm. Among the factors which contribute to the improved properties of the coated product, can be pointed out the compensation which occurs regarding unfavorable differences of quality in the substrate and between substrate and carbide layer, for instance concerning thermal expansion and mechanical strength.

The following example shows the great improvements which can be obtained by practicing the concepts of the invention. Comparihson has been made in the field of cutting between inserts coated with a carbide layer applied according to the invention and normal uncoated inserts, the specific operation being the turning of carbon steel having a C-content of about 1%. Tool wear measurements after a predetermined cutting time at given constant cutting conditions are compared.

Flank wear respectively cratering

| Hard metal grade | Flank wear, mm. | Crater depth, μm. | Time, min. |
| --- | --- | --- | --- |
| S4 (coated) | 0.10 | <5 | 15 |
| SIP | 0.21 | 55 | 15 |
| F02 | 0.11 | 8 | 15 |
| S4 (normal) | 0.98 | 306 | 15 |

NOTE.—In several different cutting operations demanding high toughness the coated S4 inserts showed the same strength as the uncoated S4 inserts.

Cutting data:
 Cutting speed: 120 m./min.
 Feed: 0.30 mm./rev.
 Cutting depth: 2.0 mm.
 Entering angle: 75°.
 Material: Carbon steel, make Sandvik 17C (1% C).

Composition in percent by weight of the hard metal.

| Grade | Co | Ni | Mo | TiC | TaC | NbC | $Cr_3C_2$ | WC |
| --- | --- | --- | --- | --- | --- | --- | --- | --- |
| S4 | 9.5 | | | 11.9 | 6 | 4 | | (1) |
| SIP | 9.5 | | | 19 | 12.2 | 3.8 | | (1) |
| F02 | | 10 | 2 | 60 | 3 | 2 | 5 | (1) |

[1] Remainder plus incidental impurities.

From this example, it is evident that the resistance to flank wear has increased about 10 times by applying the carbide surface layer and that an enormous increase of the cratering resistance has taken place.

It can further be stated that inserts of grade S4, with maintained toughness, provided with a coating according to the invention, have reached the same wear-resistance as corresponding tools in the extremely wear-resistant, but at the same time considerably less tenacious, grade F02.

The considerable improvement in wear resistance which characterize the subject of the invention, appears also from the following second example:

FLANK WEAR

| Grade | Flank width, mm. | Time, min. |
| --- | --- | --- |
| S4 (normal) | 0.20 | 3 |
| SIP | 0.20 | 15 |
| S4 (coated) | 0.20 | 40 |

CRATERING

| Grade | Crater depth, μm. | Time, min. |
| --- | --- | --- |
| S4 (normal) | 60 | 3 |
| SIP | 64 | 15 |
| S4 (coated) | 70 | 40 |

The composition in weight percent was for SIP respectively S4:

| Co | TiC | TaC | NbC | WC |
| --- | --- | --- | --- | --- |
| 9.5 | 19 | 12.2 | 3.8 | Remainder, plus incidental impurities. |
| 9.5 | 11.9 | 6 | 4 | Do. |

The article of the invention is a new cemented carbide: a composite material of the layer type, metallurgically combining a tough core with a highly wear-resistant surface layer. The new material—intended primarily for indexable tools—allows considerably increased cutting data. Thus, machines can be better utilized. Where machining times are tied—if the machines form part of a line, for example—then the intervals between tool changes can be extended and tool costs thus reduced.

Moreover, the grades of the article of the invention cover considerably wider ranges of application than corresponding conventional carbide grades. This material creates opportunities which, in the long run, could also influence machine tool investments.

The invention will now be described in greater particularity and with reference to the accompanying drawing, in which FIG. 1 represents an embodiment of a cutting insert according to the invention and indicating an inert of cemented tungsten carbide having all of its surface covered by a very thin layer of titanium carbide;

FIG. 2 is an enlarged cross-sectional, fragmentary view of an edge of the insert represented in FIG. 1 and more particularly showing the thin layer of titanium carbide deposit; and FIG. 3 is a diagrammatic representation of an apparatus adapted for use in carrying out the process of the present invention.

In FIG. 2 the edge 11 indicated in FIG. 1 is developed as a distinct layer 12 of deposited titanium carbide over the body 13 of cemented tungsten carbide.

The procedure of coating inserts according to the invention may be performed in an apparatus such as that illustrated in FIG. 3.

The deposition takes place in a retort 14, which is removably placed in a resistance-heated electrical furnace 15. The inserts to be coated are loaded on holding trays 16 and placed in the retort. The retort is connected with a vacuum pump 17 and has inlets for supplying gaseous hydrocarbon 18 and hydrogen 19. A vaporizer 20 for preparation of gaseous metal halides, specifically, $TiCl_4$ is also connected with the retort. Hydrogen is here used both as reductant and as carrier gas.

The following example illustrates the conditions under which sintered hard metal bodies have been coated with TiC, the deposition taking place in the retort illustrated in FIG. 3.

Substratum: 1500 pieces of precision-ground hard metal inserts, intended for cutting. These pieces were formed of hard metal grade (type S4) containing about 40% by volume WC, 15% by volume Co and 45% by volume cubic carbides in the form of TiC, TaC and NbC.

Coating: The hard metal inserts were placed in the retort, whereupon a gas with the composition (in percent by volume): 95 $H_2$, 3 $TiCl_4$, 2 $C_3H_8$ was passed through the charge. The gas pressure was 45 mm. Hg and the incoming gas flow 750 Ncm.³/min. The reaction took place at 850° C. and the coating obtained the desired thickness of 4 μm. after 2.5 hours. The metallographic and physical examinations showed i.a. that the surface layer of TiC was uniformly developed and had a compact, pore-free structure.

I claim:

1. Process of making an insert for machining steel and similar metals, which comprises forming to desired shape an insert body of sintered hard metal alloy consisting mostly of at least one member of the group consisting of carbides of the carbide-forming metals tungsten, titanium, tantalum, chromium and niobium together with a binder metal selected from the group consisting of cobalt, nickel and iron, positioning the formed body in an evacuable chamber, passing through said chamber and over a surface of sad formed body a stream of a gaseous phase consisting of a gaseous compound of at least one of said carbide-forming metals together with hydrogen and a gaseous hydrocarbon, at a sub-atmopheric pressure between 1 and 100 torr and an elevated temperature within the range 700–1100° C., whereby very finely divided metal carbide is deposited as a layer on said surface, and continuing the passage of said gaseous phase over said surface, at said subatmospheric pressure and said elevated temperature, until said layer has a thickness between 2 and 6 microns.

2. Insert for machining an object of steel or similar metal, said insert consisting of an inesrt body of sintered hard metal alloy of the type which besides at least one carbide selected from the group consisting of tungsten carbide, titanium carbide, tantalum carbide and niobium carbide contains a binder metal selected from the group consisting of cobalt, nickel and iron, on which body there has been applied a layer having higher wear-resistance than that of the cemented carbide in the insert body, said applied layer with higher wear resistance having a thickness of between 2 and 6 μm. (microns) and consisting of at least one member of a group of extremely fine grained carbide components selected from the group consisting of titanium carbide and solid solutions of titanium carbide with other carbides, which layer was deposited on said insert body by deposition from gaseous phase at a pressure lower than atmospheric pressure.

3. Insert according to claim 2, in which the applied layer covers at least a cutting edge and a connecting chip face.

4. Insert according to claim 2, in which the thickness of the applied layer is not greater than 5 μm. and preferably exceeds 3 μm.

5. Insert according to claim 2, in which the insert body was formed to the desired shape before deposition of the applied layer.

6. Insert according to claim 2, in which the carbides in the sintered hard metal alloy have a mean grain size between 0.5–3 μm.

7. Insert according to claim 2, in which the sintered hard metal alloy consists in percentages by weight, of 4–24% TiC, 0–20% component selected from the group consisting of TaC and NbC, 7–11% of a second component selected from the group consisting of Ni and the remainder practically all WC.

8. Insert according to claim 2, in which the applied layer covers the chip face or faces and preferably also the clearance face or faces but leaves the cutting edge or edges free.

9. Insert according to claim 2, in which the carbide component included in the surface layer has a carbon content essentially below the stoichiometric composition of such carbide.

10. Insert according to claim 2, in which the carbide component included in the surface layer has a carbon content constituting maximum 9/10 and minimum ½ of the stoichiometric carbon content.

11. Insert according to claim 2, in which the carbide component included in the surface layer is titanium carbide having a carbon content exceeding 10% and below 15% by weight.

12. Insert according to claim 2, in which the composition of the surface layer is modified by an active amount within the weight percent range 0.5% and 5% of a member of the group consisting of oxygen and nitrogen which modifying component enters the layer in the form of extremely fine-dispersed oxide or nitride of at least one of the carbide-forming metals.

13. Insert according to claim 2, in which the surface layer is built up of an inner, extremely fine-grained, zone with a grain-size of 0.02–0.15 μm. next to the insert body and an outer, somewhat more coarse-grained, zone with a grain-size of about 0.2–0.4 μm.

14. Insert according to claim 2, in which the insert body next to the surface layer has a lower carbon content that has the remaining part of the cutting body.

15. Insert according to laim 14, in which the zone having a lower carbon content consists of low carbon phases in the W-Co-C-system, principally $\eta$-phase (eta-phase).

16. Insert according to claim 15, in which Co in the low carbon phases has entirely or partly been substituted by Fe, Ni and/or Cr.

17. Insert according to claim 14, in which the zone with remarkably lower carbon content has a thickness between 1–12 $\mu$m., and preferably greater than 3 $\mu$m. and less than 10 $\mu$m.

18. Process defined in claim 1, in which a zone of the insert body contiguous with said layer has a lower than conventional carbon content and includes low carbon phases, including chiefly the $\eta$-phase (eta-phase) in the system M-Co-C where M represents a carbide-forming metal of the defined group.

19. The process defined in claim 1, in which said alloy also contains a small but effective amount, within the range 0.5–5.0% by weight, of a decarburizing substance selected from the group consisting of decarburizing metal oxides and nitrides, whereby the carbon content of the surface layer of the insert body becomes reduced substantially below stoichiometric proportion during the ensuing deposition step.

20. The process defined in claim 1, in which the formed insert body is subjected to surface decarburization prior to the aforesaid deposition step; whereby the deposited surface layer of fine particles of carbide overlaps a zone of alloy significantly deficient as to carbon content.

21. The process defined in claim 20, wherein said surface decarburization is accomplished by surrounding the formed body with a decarburizing medium and effecting the sintering of the body whilst so surrounded.

References Cited
UNITED STATES PATENTS

| | | | |
|---|---|---|---|
| 3,564,683 | 2/1971 | Schedler | 29—95 |
| 2,645,471 | 7/1953 | King | 76—101 X |
| 2,414,231 | 1/1947 | Kraus | 29—95 |

HARRISON L. HINSON, Primary Examiner

U.S. Cl. X.R.

76—101